US009550124B2

(12) United States Patent
Davis et al.

(10) Patent No.: US 9,550,124 B2
(45) Date of Patent: Jan. 24, 2017

(54) PROJECTION OF AN INTERACTIVE ENVIRONMENT

(71) Applicant: MEP Tech, Inc., Salt Lake City, UT (US)

(72) Inventors: Mark L. Davis, West Jordan, UT (US); Timothy Alan Tabor, West Jordan, UT (US); Roger H. Hoole, Salt Lake City, UT (US); Jeffrey Taylor, Naperville, IL (US); John M. Black, West Jordan, UT (US)

(73) Assignee: MEP TECH, INC., Salt Lake City, UT (US)

( * ) Notice: Subject to any disclaimer, the term of this patent is extended or adjusted under 35 U.S.C. 154(b) by 0 days.

(21) Appl. No.: 14/462,750

(22) Filed: Aug. 19, 2014

(65) Prior Publication Data

US 2014/0354603 A1    Dec. 4, 2014

Related U.S. Application Data

(63) Continuation of application No. 13/547,626, filed on Jul. 12, 2012, now Pat. No. 8,808,089, which is a
(Continued)

(51) Int. Cl.
*A63F 13/52*    (2014.01)
*A63F 13/65*    (2014.01)
(Continued)

(52) U.S. Cl.
CPC ............. *A63F 13/52* (2014.09); *A63F 9/0468* (2013.01); *A63F 13/10* (2013.01); *A63F 13/42* (2014.09);
(Continued)

(58) Field of Classification Search
CPC .... G06F 3/01; A63F 13/10; A63F 2300/1087; A63F 2300/66; A63F 2300/6045; A63F 2300/69; A63F 2009/2463; G09G 5/02
See application file for complete search history.

(56) References Cited

U.S. PATENT DOCUMENTS

| 5,844,985 | A | 12/1998 | Kulberg et al. |
| 5,853,327 | A | 12/1998 | Gilboa |

(Continued)

FOREIGN PATENT DOCUMENTS

| EP | 1827630 | 5/2008 |
| WO | 2007107874 | 9/2007 |
| WO | 2009149112 | 12/2009 |

OTHER PUBLICATIONS

Stephen J. Krotosky, Mohan M. Trivedi, "A Comparison of Color and Infrared Stereo Approaches to Pedestrian Detection", Jun. 13-15, 2007, Proceedings of the 2007 IEEE Intelligent Vehicles Symposium, pp. 81-86.*
(Continued)

*Primary Examiner* — John P Dulka
(74) *Attorney, Agent, or Firm* — Durham Jones & Pinegar, P.C.

(57) ABSTRACT

An interactive environment image may be projected onto one or more surfaces, and interaction with the projected environment image may be detected within a three-dimensional space over the one or more surfaces. The interactive environment image may be a three-dimensional image, or it may be two-dimensional. An image is projected onto a surface to provide a visual environment representation of a virtual space including one or more of the virtual objects, which may be spatially positioned. User interaction with the projected visualized representation of the virtual environment space may be detected and, in response to user interaction, the projected visualized representation may be changed.

20 Claims, 9 Drawing Sheets

Related U.S. Application Data continuation-in-part of application No. 12/855,604, filed on Aug. 12, 2010, now abandoned, which is a continuation-in-part of application No. 12/651,947, filed on Jan. 4, 2010, now abandoned, and a continuation-in-part of application No. 12/411,289, filed on Mar. 25, 2009, now abandoned.

(51) Int. Cl.

| | | |
|---|---|---|
| A63F 13/42 | (2014.01) | |
| G06F 3/042 | (2006.01) | |
| G06F 3/0481 | (2013.01) | |
| G06F 3/0488 | (2013.01) | |
| A63F 13/40 | (2014.01) | |
| A63F 1/00 | (2006.01) | |
| A63F 9/04 | (2006.01) | |
| A63F 9/24 | (2006.01) | |

(52) U.S. Cl.
CPC .............. *A63F 13/65* (2014.09); *G06F 3/0425* (2013.01); *G06F 3/04815* (2013.01); *G06F 3/04883* (2013.01); *A63F 1/00* (2013.01); *A63F 9/04* (2013.01); *A63F 2001/008* (2013.01); *A63F 2009/2425* (2013.01); *A63F 2009/2463* (2013.01); *A63F 2250/30* (2013.01); *A63F 2300/1087* (2013.01); *A63F 2300/6045* (2013.01); *A63F 2300/66* (2013.01); *A63F 2300/69* (2013.01); *G06F 2203/04808* (2013.01)

(56) References Cited

U.S. PATENT DOCUMENTS

| | | |
|---|---|---|
| 6,281,878 B1 | 8/2001 | Montellese |
| 6,331,145 B1 | 12/2001 | Sity et al. |
| 6,611,252 B1 | 8/2003 | DuFaux |
| 6,614,422 B1 | 9/2003 | Rafii et al. |
| 6,650,318 B1 | 11/2003 | Arnon |
| 6,710,770 B2 | 3/2004 | Tomasi et al. |
| 6,750,849 B2 | 6/2004 | Potkonen |
| 6,798,401 B2 | 9/2004 | DuFaux |
| 6,832,954 B2 | 12/2004 | Odake et al. |
| 6,955,297 B2 | 10/2005 | Grant |
| 7,095,033 B2 | 8/2006 | Sorge |
| 7,204,428 B2 | 4/2007 | Wilson |
| 7,753,798 B2 | 7/2010 | Soltys et al. |
| 8,485,907 B2 | 7/2013 | Soltys et al. |
| 8,933,974 B1 | 1/2015 | Marason et al. |
| 2004/0102247 A1* | 5/2004 | Smoot et al. .................. 463/36 |
| 2004/0160000 A1 | 8/2004 | Lindsey et al. |
| 2005/0245302 A1 | 11/2005 | Bathiche et al. |
| 2006/0050243 A1 | 3/2006 | Huewel |
| 2006/0052885 A1 | 3/2006 | Kong |
| 2006/0073869 A1 | 4/2006 | LeMay et al. |
| 2006/0073892 A1 | 4/2006 | Watanabe et al. |
| 2006/0274972 A1 | 12/2006 | Peterson |
| 2007/0046625 A1 | 3/2007 | Yee |
| 2007/0178955 A1 | 8/2007 | Mills |
| 2007/0201863 A1 | 8/2007 | Wilson et al. |
| 2008/0032808 A1 | 2/2008 | Ochi |
| 2008/0122805 A1 | 5/2008 | Smith et al. |
| 2008/0278894 A1 | 11/2008 | Chen et al. |
| 2008/0280682 A1 | 11/2008 | Brunner et al. |
| 2008/0318550 A1 | 12/2008 | DeAtley |
| 2009/0020947 A1 | 1/2009 | Albers |
| 2009/0029754 A1 | 1/2009 | Slocum et al. |
| 2009/0104976 A1 | 4/2009 | Ouwerkerk et al. |
| 2009/0124382 A1 | 5/2009 | Lachance et al. |
| 2009/0168027 A1* | 7/2009 | Dunn .................... G03B 21/26 353/28 |
| 2009/0185139 A1 | 7/2009 | Morikuni |
| 2009/0264196 A1 | 10/2009 | Fujimoto |
| 2009/0323029 A1 | 12/2009 | Chen et al. |
| 2010/0020026 A1 | 1/2010 | Benko et al. |
| 2010/0035684 A1 | 2/2010 | Kotlarik et al. |
| 2010/0113148 A1 | 5/2010 | Haltovsky et al. |
| 2010/0182402 A1 | 7/2010 | Nakajima et al. |
| 2010/0241976 A1 | 9/2010 | Nozaki et al. |
| 2010/0279768 A1 | 11/2010 | Huang et al. |
| 2010/0285881 A1 | 11/2010 | Bilow |
| 2011/0007140 A1 | 1/2011 | Nakahata et al. |
| 2011/0133934 A1 | 6/2011 | Tan et al. |
| 2011/0165923 A1 | 7/2011 | Davis et al. |
| 2011/0181553 A1 | 7/2011 | Brown et al. |
| 2011/0256927 A1 | 10/2011 | Davis et al. |
| 2011/0288964 A1 | 11/2011 | Linder et al. |
| 2012/0026376 A1 | 2/2012 | Goran |
| 2012/0223885 A1 | 9/2012 | Perez |
| 2012/0280941 A1 | 11/2012 | Hu |
| 2013/0113975 A1 | 5/2013 | Gabris |
| 2014/0043516 A1 | 2/2014 | Baker |

OTHER PUBLICATIONS

European Patent Office as International Searching Authority, "International Search Report and Written Opinion," mailed Jun. 7, 2011, in related PCT application No. PCT/US2011/020058.

Mike Hanlon, "Philips Entertaible—Electronic Multi-Touch Tabletop Gaming Platform," gizmag, Sep. 3, 2006, accessible online at http://www.gizmag.com/go/6093/.

Andrew D. Wilson, "PlayAnywhere: a compact interactive tabletop projection-vision system;" USIT '05 Proceedings of the 18th annual ACM symposium on User interface software and technology; Publisher ACM New York, New York, year 2005, pp. 83-92.

Ramesh Raskar, Greg Welch, Matt Cutts, Adam Lake, Lev Stesin, Henry Fuchs, "The Office of the Future: A Unified Approach to Image-Based Modeling and Spatially Immersive Displays", Jul. 19-24, 1998, ACM, Proceedings of the 25th Annual Conference on Computer Graphics and Interactive Techniques, pp. 179-188.

Andrew D. Wilson, Hrvoje Benko, "Combining Multiple Depth Cameras and Projectors for Interactions on, Above, and Between Surfaces", Oct. 6, 2010, ACM, Proceedings of the 23rd Annual ACM Symposium on User Interface Software and Technology, pp. 273-282.

Ramesh Raskar, Jeroen van Baar, Paul Beardsley, Thomas Willwacher, Srinivas Rao, Clifton Forlines, "iLamps: Geometrically Aware and Self-Configuring Projectors", 2003, ACM, ACM SIGGRAPH 2003 Conference Proceedings.

Bernd Frohlich, Jan Hochstrate, Jorg Hoffman, Karsten Kluger, Roland Blach, Matthias Bues, Oliver Stefani, "Implementing Multi-Viewer Stereo Displays", Jan. 31-Feb. 4, 2005, Union Agency, WSCG '2005: Full Papers: The 13-th International Conference in Central Europe on Computer Graphics, Visualization and Computer Vision 2005, pp. 139-146.

Alexander Kulik, Andre Kunert, Stephan Beck, Roman Reichel, Roland Blach, Armin Zink, Bernd Froehlich, "C1x6: A Stereoscopic Six-User Display for Co-located Collaboration in Shared Virtual Environments", Dec. 2011, ACM, ACM Transactions on Graphics, vol. 30, No. 6, Article 188.

Chris Harrison, Hrvoje Benko, Andrew D. Wilson, "OmniTouch: Wearable Multitouch Interaction Everywhere", Oct. 19, 2011, ACM, UIST '11 Proceedings of the 24th Annual ACM Symposium on User Interface Software and Technology, pp. 441-450.

Andrew D. Wilson, "PlayAnywhere: A Compact Interactive Tabletop Projection-Vision System", Oct. 23-27, 2005, ACM, UIST '05 Proceedings of the 18th Annual ACM Symposium on User Interface Software and Technology, pp. 83-92.

Philip Staud, Rui Wang, "Palmap: Designing the Future of Maps", Nov. 23-27, 2009, ACM, OZCHI '09 Proceedings of the 21st Annual Conference of the Australian Computer-Human Interaction Special Interest Group: Design: Open 24/7, pp. 427-428.

Claudio Pinhanez, "The Everywhere Displays Projector: A Device to Create Ubiquitous Graphical Interfaces", 2001, Springer-Verlag, Ubicomp 2001: Ubiquitous Computing, pp. 315-331.

Oliver Bimber, Gordon Wetzstein, Andreas Emmerling, Christian Nitschke, "Enabling View-Dependent Stereoscopic Projection in

(56) References Cited

OTHER PUBLICATIONS

Real Environments", Oct. 5-8, 2005, IEEE, Proceedings of the International Symposium on Mixed and Augmented Reality (ISMAR '05).
International Search Report and Written Opinion in corresponding Application No. PCT/US2014/051365 dated Apr. 2, 2015.

* cited by examiner

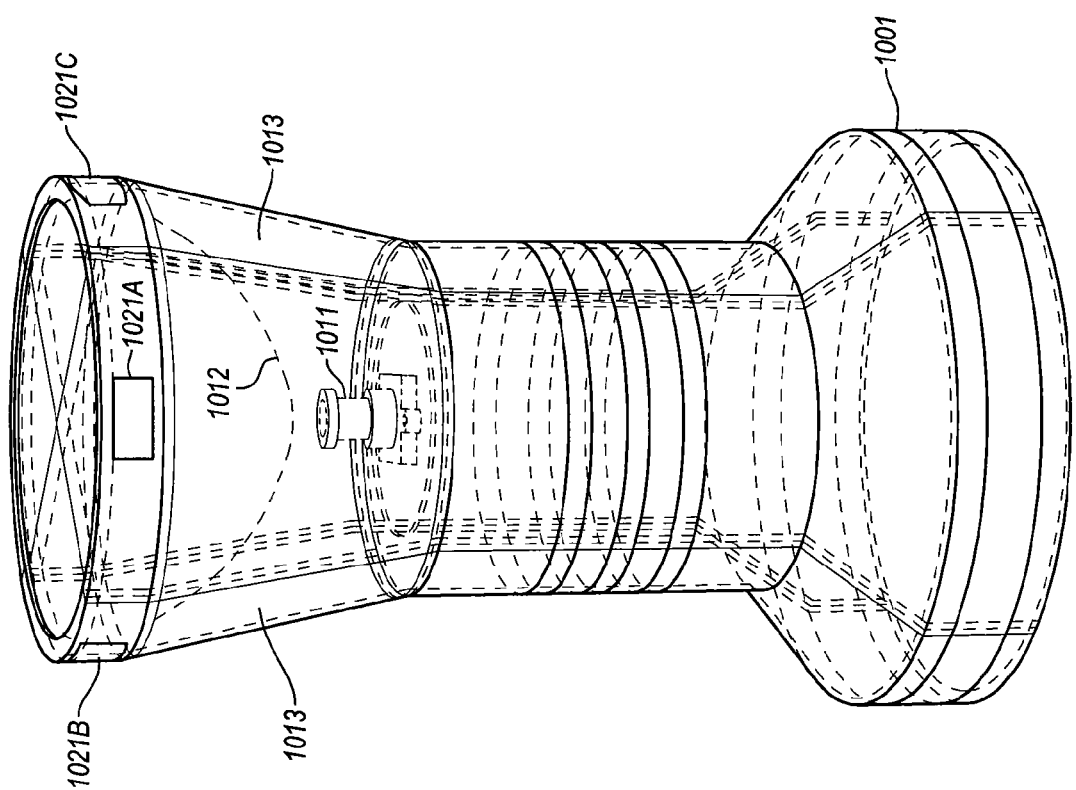

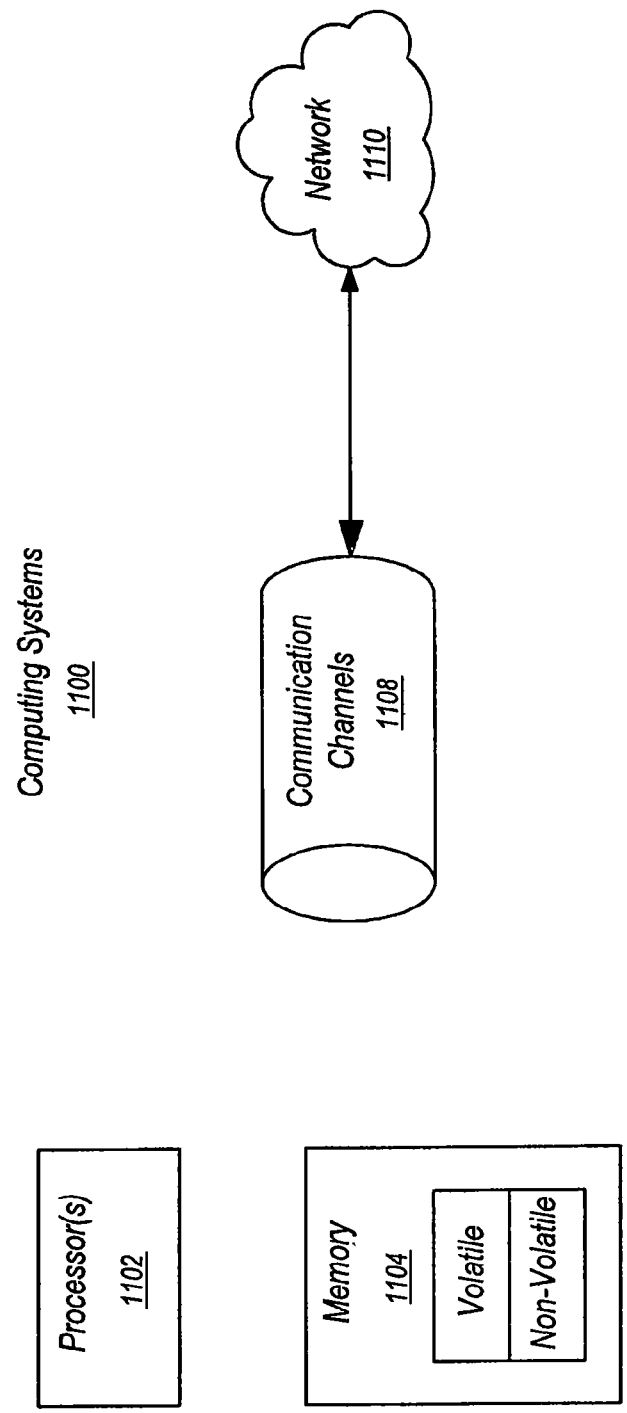

PROJECTION OF AN INTERACTIVE ENVIRONMENT

CROSS REFERENCE TO RELATED APPLICATIONS

This application is a continuation of U.S. patent application Ser. No. 13/547,626, which was filed on Jul. 12, 2012, now U.S. Pat. No. 8,808,089, issued Aug. 19, 2014, titled PROJECTION OF INTERACTIVE GAME ENVIRONMENT ("the '626 Application"). The '626 Application is a continuation of U.S. patent application Ser. No. 12/855,604, filed Aug. 12, 2010, titled PROJECTION OF INTERACTIVE GAME ENVIRONMENT ("the '604 Application"). The '604 Application is a continuation-in-part of U.S. patent application Ser. No. 12/651,947, filed Jan. 4, 2010, titled ELECTRONIC CIRCLE GAME SYSTEM ("the '947 Application"). The '947 Application is a continuation-in-part of U.S. patent application Ser. No. 12/411,289, filed Mar. 25, 2009, titled WIRELESSLY DISTRIBUTED ELECTRONIC CIRCLE GAMING ("the '289 Application").

The entire disclosures of the '626 Application, the '604 Application, the '947 Application and the '289 Application are, by this reference, incorporated herein.

RELATED ART

There are a variety of conventional displays that offer an interactive experience. Computer displays, for example, display images, which can be affected by user input to a keyboard, mouse, controller, or another input device. In some cases, the computer display itself acts as an input device using touch or proximity sensing on a display. There are even now multi-touch functional displays that can receive user input from multiple touches simultaneously.

Sometimes, however, the use of such displays tends to discourage some types of conventional social interaction. For instance, games have provided a social context in which people can interact and have fun. One type of game that is particularly engaging socially is "circle" games, where players will gather around a central horizontal play area that is visible to all players, and interact with the central horizontal play area and with each other. Such players are often as few as two (as is the case with chess or checkers), but may be as many as a dozen or more. Board games are circle games in which the board serves as the central horizontal play area. However, there are other circle games that have a central play area that is not a board. For instance, many card games can be played directly on the surface of a table or other flat surface. Many circle games involve the players manipulating objects on or proximate the play area. For example, many circle games require the player to role dice, start a timer, spin a spinner, play cards, move pieces, and so forth, depending on the game.

Circle games have existed for thousands of years across diverse cultures. New circle games arise to meet the social needs and interests of the community while old circle games go out of use as society loses interest. Many believe that circle games provide significantly more opportunity for social development than other types of conventional video games that are strong in popularity in modern times. The contribution of circle games to society should not be ignored, but often is.

Circle games can provide an impetus for bringing families, friends, and other significant social groups together and fostering important human relationships. Children wait with great eagerness to engage with others in circle games. The types of circle games that individuals enjoy may change as one grows older, and may differ between population segments. Nevertheless, circle games draw human beings together with the immediate hope of engaging others in a test of skill, while the horizontal play area provides a subtle and significant side-benefit in permitting channels of communication to be opened, as players are positioned to face each other. Many have experienced that the conversation migrates to topics beyond the scope of the game itself, often resulting in a level of conversation that is greater than particular individuals might be inclined to engage in without the circle game. The benefit to society in encouraging individuals to come together in circle games is often underestimated and not fully recognized in a society in which people choose more and more to absorb themselves into fictional worlds.

SUMMARY

Embodiments described herein relate to the projection of an interactive environment image on a surface. The interactive environment image may be a three-dimensional image, or may be two-dimensional. Data is received that represents virtual objects that are spatially positioned in virtual environment space. An interactive environment image is then projected on a surface that includes a visual representation of all or a portion of the virtual game environment space including one or more of the virtual objects. The system may then detect user interaction with the projected visualized representation of the virtual environment space, and in response thereto, change the projected visualized representation. That interaction may be via an input device, or even more directly via physical interaction with the interactive environment image. In the case of direct interaction, the user might interact with a virtual object within the interactive environment image, or with a physical object (such as a game piece or a game board) that is within the space of the interactive environment image. Thus, a user may interact with visualized representations of virtual environment space enabling complex and interesting interactivity scenarios and applications.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 10 illustrates another concrete example of the interactive image projections system in which a single projector is operating, and which does use intervening optics in the projection operation; and FIG. 11 illustrates a computing system architecture in which the principles described herein may be employed in at least some embodiments.

DETAILED DESCRIPTION

The principles described herein relate to the projection of an interactive environment image on a surface. The interactive environment image may be a two-dimensional, or may even include three-dimensional image information, such that the image may be viewed as a three-dimensional image with appropriate aids. Data is received that represents virtual objects that are spatially positioned in virtual environment space. The interactive environment image is then projected on the surface that includes a visual representation of all or a portion of the virtual environment space including one or more of the virtual objects. The interactive image projection system may then detect user interaction with the projected visualized representation of the virtual environment space, and in response thereto, change the interactive environment image, and perhaps cause a permanent change to game state.

Figure 1:
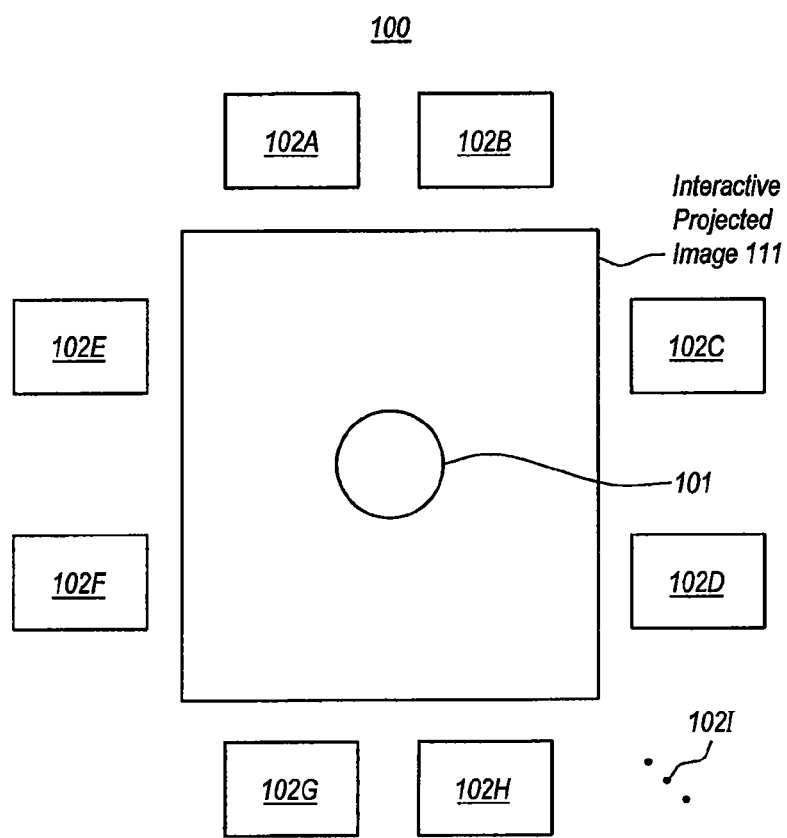
FIG. 1 abstractly illustrates a distributed electronic game system.

Although not required, the input mechanism may be especially useful in a distributed electronic game system. FIG. 1 abstractly illustrates a distributed electronic game system 100. The distributed electronic game system 100 includes an interactive image projection system 101. The interactive image projection system 101 projects an interactive environment image 111 onto a surface. Through unique features of the distributed electronic game system 100 described hereinafter, the projected interactive environment image 111 is made to be interactive.

In one embodiment, the surface is a substantially horizontal surface in which case the interactive environment image 111 is projected downwards on the surface. As an example, the substantially horizontal surface may be a table top, counter top, a floor, a game board, or any other substantially horizontal surface. In this description and in the claims, a "substantially horizontal" surface may be any surface that is within 30 degrees of horizontal. In this description and in the claims, a "more precisely horizontal" surface may be any surface that is within 5 degrees of horizontal.

In another embodiment, the surface may be a more complex surface. For instance, the surface on which the interactive environment image 111 may be projected may include a combination of a substantially horizontal surface and a substantially vertical surface. In this description and in the claims, a "substantially vertical" surface may be any surface that is within 30 degrees of vertical. In this description and in the claims, a "more precisely vertical" surface may be any surface that is within 5 degrees of vertical. As an example, the complex surface might include a floor or table area (or a game board) as a substantially horizontal surface, and a wall as a substantially vertical surface. The substantially vertical surface might also be a translucent material (such as glass). Other examples of complex surfaces may include texture surfaces, as well as surfaces with a topology.

The interactive environment image 111, as projected by the interactive image projection system 101 onto the surface, represents an interactive game environment area in which one or more players may interact either through a player console, or directly via the image itself. However, the interactive environment image 111 might also be a collaboration area, a work area, or any other type of interactive area. In the remainder of this description, the distributed electronic game system 100 is often described as being a game in a particular example. In that case, the user(s) would each be a player, and the interactive environment image 111 would be projected onto an interactive game environment area. The principles described herein may apply to any environment in which one or more users interact with a projected image on a surface.

Since FIG. 1 is abstract only, the interactive image projection system 101 and the interactive environment image 111 are only abstract representations. Subsequent figures will illustrate a more concrete representation of an example of the interactive image projection system 101 and the interactive environment image 111.

Optionally, the distributed electronic game system 100 also includes surrounding control devices (also called herein "input devices"). There are eight such input devices 102A through 102H illustrated in FIG. 1, although the ellipses 102I represent that there may be less than or greater than eight devices 102. The input devices 102 are each represented abstractly as rectangles although they will each have a particular concrete form depending on their function and design. Example forms are described further below. In the context of a game, for example, the input devices 102 may be player consoles. However, the input devices 102 are optional only. Instead of providing input through the input devices 102, the users may instead provide input through direct contact with the interactive environment image 111 using, for example, a finger, or manipulating physical game pieces positioned within the interactive environment image 111, or perhaps rolling dice or playing cards within the interactive environment image 111. The interactive image projection system 101 is capable of responding to multiple simultaneous instances of users interacting with the interactive environment image 111. Thus, input into the distributed electronic game system 100 may be achieved using either one or more of input devices 102 and/or by direct interaction with the interactive environment image 111. Thus, the users may affect the game state in this manner.

In one embodiment, one, some, or even all of the input devices 102 are wireless. In the case of a wireless input device 102, the wireless input device 102 may communicate wirelessly with the interactive image projection system 101. One, some or even all of the input devices 102 may be remotely located from the interactive environment image 111. Such remotely located input device(s) 102, may perhaps communicate with the interactive image projection system 101 over a Wide Area Network (WAN) such as the Internet. That would enable a user to participate in the interactive environment image 111 even if that player is located in a completely different part of the globe. Thus, for example, a father or mother stationed overseas might play a child's favorite board game with their child before going to bed. Or perhaps former strangers and new friends from different cultures around the globe might engage in a game, potentially fostering cross-cultural ties while having fun. That said, perhaps all of the input devices 102 may be local (e.g., in the same room) to the interactive image projection system 101. In yet another embodiment, there are no input devices 102. Regardless of whether there are input devices 102 or not, the user might directly interact with the interactive environment image 111.

Figure 2:
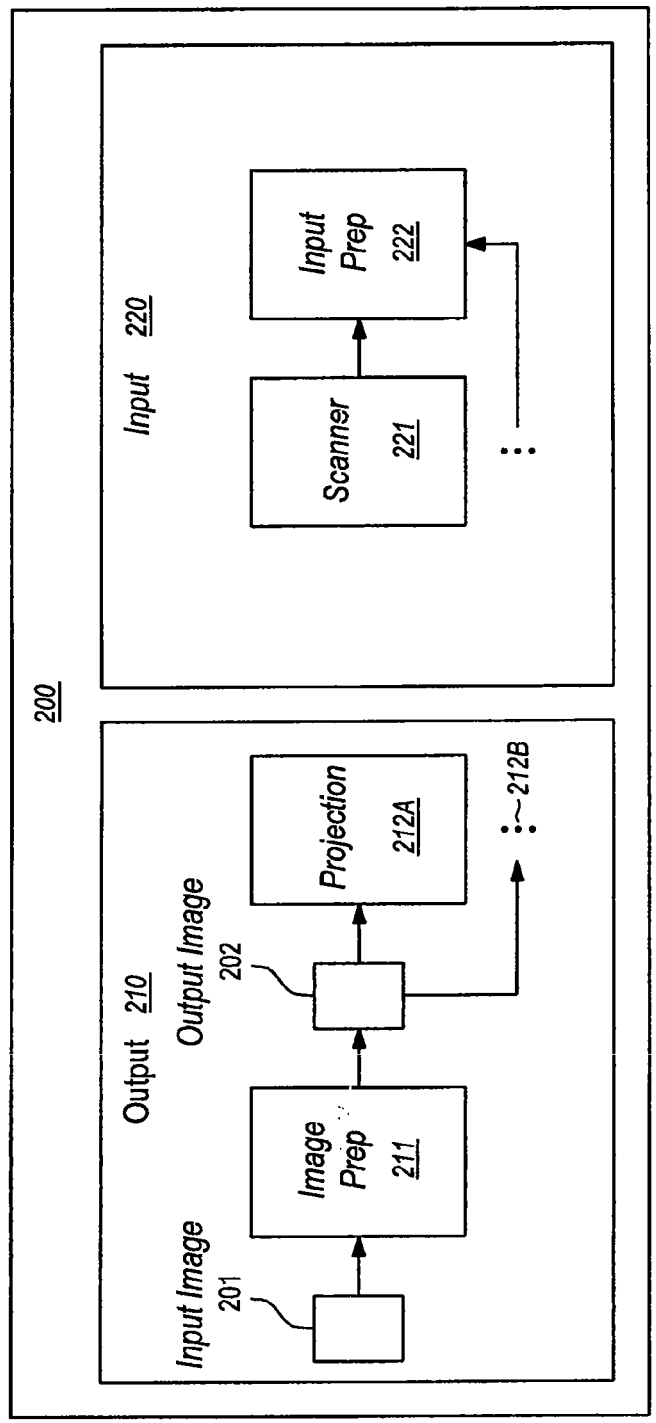
FIG. 2 abstractly illustrates an interactive image projection system that represents an example of the interactive image projection system of FIG. 1.

FIG. 2 abstractly illustrates an interactive image projection system 200 that represents an example of the interactive image projection system 101 of FIG. 1. The interactive image projection system 200 is illustrated as including an output channel 210 that projects an image (such as interactive environment image 111) onto a surface. The output channel 210 includes several functions including image preparation and projection. Image preparation is performed by an image preparation mechanism 211, and projection of the image is performed by projector(s) 212A, 212B, etc., with one projector 212A being depicted and the ellipses 212B representing one or more optional additional projectors 212 in the output channel 210 of the interactive image projection system 200.

The image preparation mechanism 211 receives an input image 201 and supplies an output image 202 in response to receiving the input image 201. The input image 201 may be provided by any image generator. As an example, the input image 201 might be provided by a video game console, a rendering program (whether two-dimensional or three-dimensional), or any other module, component or software, that is capable of generating an image.

The input image 201 represents one or more virtual objects that are spatially positioned in a virtual environment space. As an example, the virtual environment space may represent a battleground with specific terrain. The battleground is represented in a computer, and need not represent any actual battleground. Other examples of virtual space might include a three-dimensional representation of the surface of the moon, a representation of a helium atom, a representation of a crater of a fictional planet, a fictional spacecraft, outer space, a fictional subterranean cave network, and so forth. Whether representing something real or imagined, the virtual environment space is created by a computer programmer either directly, or indirectly through the creation of logic that creates the virtual environment space.

Virtual objects are placed in the virtual game environment space also by a computer programmer (or indirectly by logic created by the programmer), and may represent any object, real or imagined. For instance, a virtual object might represent a soldier, a tank, a building, a fictional anti-gravity machine, or any other possible object, real or imagined.

Figure 3:
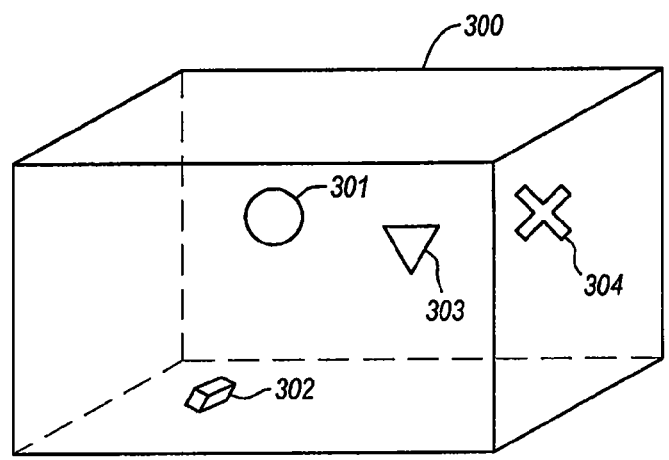
FIG. 3 illustrates an example embodiment of a environment space that includes virtual objects.

FIG. 3 illustrates an example of a virtual environment space 300. In this example, the virtual environment space 300 includes objects 301, 302, 303 and 304. In this case, the virtual environment space 300 is three-dimensional, such that the objects 301, 302, 303 and 304 are each represented as three-dimensional objects having a specific shape and positioning within the three-dimensional virtual environment space 300. This virtual environment space 300 may be used in order to formulate an image representation of a certain portion and/or perspective of the virtual environment space 300. The output image 202, as projected includes a visual representation of at least part of the virtual environment space 300, the visualized representation includes a visualized representation of at least some of the virtual objects. For instance, if the virtual environment space 300 included terrain for the inside of a crater, the projected image may show a visual representation of a portion of that crater, with virtual objects that might include several crater monsters, soldiers that are members of the same team, weapons that are strewn about and ready to be picked up, and so forth. If the virtual environment space 300 were a city, the visualized representation might be a portion of the city and include vehicles, buildings, people, and so forth.

The image preparation mechanism 211 may perform any processing on the input image 201 to generate the output image 202 that is ultimately projected by the one or more projectors 212. As an example, the image preparation mechanism 211 may simply pass through the input image 201 such that the output image 202 is identical to the input image 201. The image preparation mechanism 211 might also change the format of the image, change the resolution of the image, compress the image, decrypt the image, select only a portion of the image, and the like. If multiple projectors are being used, the image preparation mechanism 211 may select which portion (i.e., also referred to as a "subimage") of the input image 201 is to be projected by each projector, such that when the images are projected by each projector, the collective whole of all of the projected images appears as a single image on the surface where the images are projected. This is referred to herein as stitching.

The image preparation might also take into consideration appropriate adjustments given the surface on which the output image 202 is to be projected, or any intervening optics. For instance, if the surface is a complex surface, the image preparation mechanism 211 may adjust the image such that the output image 202 appears properly on the surface. The user might configure the image preparation mechanism 211 with information regarding the surface. Alternatively or in addition, the interactive image projection system 200 may be configured to enter a discovery phase upon physical positioning that identifies the characteristics of the surface in relation to the projection mechanism. As an example, if the surface is a combination of horizontal and vertical surfaces, the image preparation may take into consideration the distances and the angles of the surface to make sure that the output image 202 appears proportional as intended on each surface. Thus, the image preparation mechanism 211 may make appropriate geometrical adjustments to the image so that the output image 202 appears properly on the surface. Other examples of complex surfaces include spherical surfaces, surfaces that represent a topography (as in a complex terrain with various peaks and valleys), surfaces that include a cylindrical surface, surfaces that include convex portions, and/or surfaces that include concave portions. In the case in which the image is to pass through optics such as lens and mirrors, the image preparation mechanism 211 may consider the presence of such optics.

In addition to image preparation and projection, the interactive image projection system 200 may also output various signals. For instance, the interactive image projection system 200 may output audio, such as perhaps the audio of the video game console that provides the input image 201. The interactive image projection system 200 may output wired or wireless signals to the input devices 102, perhaps causing some private state to be altered at the input devices 102. In addition, if there is a central display that displays an interactive environment image 111 (such as the interactive central display described in the co-pending commonly assigned application Ser. No. 12/411,289) (hereinafter referred to simply as the "central display"), the interactive image projection system 200 may dispatch information in a wired or wireless fashion to the central display.

As described above, user input may be provided through interaction with an input device (such as one of the input devices 102 of FIG. 1) and/or through direct interaction of a real object (such as a human finger, a game piece, a game board, a central display or the like) within the area of the interactive environment image 111. If there is to be direct interaction to provide input, the interactive image projection system 200 may also include an input channel 220.

The input channel 220 includes a scanning mechanism 221 configured to scan the area projected by the interactive environment image 111 to determine one or more positions of a real interactivity input object.

As an example, suppose that the output image 202 of FIG. 2 includes just two-dimensional information. In that case, for each image frame, the projector(s) 212 projects the image. Then, after that frame is projected, during a short period in which the image is not projected, the scanning mechanism 221 may scan the area in which the last frame was projected. This projection and scanning process is then repeated for the next frame image, and for the next, and so on. Even though projection and scanning do not happen at the same time (with scanning happening between image frame projections), they happen at such a high frequency that the projected image seems to have continuous motion. Furthermore, even though the projected image is not always present, the period of time that the projected image is not present is so short, and occurs at such a frequency, that it gives the illusion to the human observer that the projected image is always present. Thus, real objects have the appearance of occupying the same space as the projected image.

As another example, the output image 202 of FIG. 2 may represent three-dimensional information. In that case, for each image frame, the projector(s) 212 may project a left eye image intended for the left eye, and a right eye image intended for the right eye. When appropriate aids are present that allow the left eye of a human observer to receive the left eye image (but not the right eye image), and that allow the right eye of that same human observer to receive the right eye image (but not the left eye image), the image can be observed by the human mind as being truly three-dimensional. 3-D glasses are an appropriate aid for enabling this kind of eye-specific light channeling, but the principles of the present invention are not limited to the type of aid used to allow a human observer to conceptualize three-dimensional image information.

In one example, the projection of the left eye image and the right eye image are interlaced, with each being displayed at a frequency at which continuous motion is perceived by a human observer. Typically 44 frames per second is the threshold above which an average human observer cannot distinguish discrete changes between frames, but instead perceives continuous motion. Thus, a system that operates at 120 Hz, and which interlaces a left eye image and a right eye image, each at 60 Hz, will suffice to formulate the appearance of continuous three-dimensional motion. At periodic times between frames, the scanning mechanism 221 may scan for real objects in the scope of the projected image. In a projection system that operates at 120 Hz, for example, the scanning may also occur between every frame at 120 Hz, or perhaps between every other frame at 60 Hz, or perhaps at some other interval. That said, the principles described herein are not limited to any particular frame rate for projection and sampling rate for scanning.

The input channel 220 of the interactive image projection system 200 may also include an input preparation function provided by, for example, an input preparation mechanism 222. This input preparation mechanism 222 may take the input provided through the scanning process and provide it in another form recognizable by a system that generates the input image 201 (such as perhaps by a conventional video game system). For instance, the input preparation mechanism 222 may receive information from the scanning mechanism 221 that allows the input preparation mechanism 222 to recognize gestures and interaction with virtual objects that are visualized. The input preparation mechanism 222 might recognize the gesture, and correlate that gesture to particular input. The input preparation mechanism 222 may consider the surface configuration, as well as any optics (such as mirrors or lenses) that may intervene between the surface and the scanning mechanism 221.

As an example, suppose that the projected image is of a game board, with pieces placed on the game board. The user might reach into the projected image, touch a projected game piece with a finger (or more accurately stated, "simulate touching" since the projected game piece is just a projection), and move that game piece from one location of the projected game board to another, thereby advancing the game state of the game perhaps permanently. In that case, the movement may occur over the course of dozens or even hundreds of frames, which occurs in but a small moment by the user's perspective. The input preparation mechanism 222 recognizes that a human finger has reached into the space that is occupied by the projected image, and has intersected the finger with the space that is occupied by the visualization of the game piece. If the image were a three-dimensional image, the input preparation mechanism 222 would monitor the position of the user's finger in three-dimensional space, and have a concept for the three-dimensional position of the virtual game piece. The game piece is just a projected portion of the image, and thus the user would not feel a game piece. Nevertheless, the input preparation mechanism 222 recognizes that the user has now indicated an intent to perform some action on the projected game piece.

In subsequent frames, the input preparation mechanism 222 recognizes slight incremental movement of the finger, which represents intent to move the game piece in the same direction and magnitude as the finger moved. The input preparation mechanism 222 knows what commands to issue to cause the projector(s) 212 to cause that projected game piece to move in the virtual environment space 300. The changes can be almost immediately observed in the projected image. This occurs for each frame until the user indicates an intent to no longer move the game piece (perhaps by tapping the surface on which the projected image is projected at the location at which the user wishes to deposit the projected game piece).

The appearance to the player would be as though the player had literally contacted the game piece and caused the game piece to move, even though the game piece is but a projection. Accordingly the interactive image projection system 200 may move projected objects. Other actions might include resizing, re-orienting, changing the form, or changing the appearance of the virtual object that the user interacted with.

The interactive image projection system 200 may interface with a conventional image generation system to enable the appearance of an interactive environment image 111. After all, the interactive image projection system 200 receives the input image 201 which is generated by the external system, although additional processing of the image may occur within the image preparation mechanism 211, which is then projected. However, the external image generation system just generates the image in the same manner as if the image were just to be displayed on a conventional display. Furthermore, the external image generation system receives commands as it is accustomed to receive them to thereby effect a permanent change to the game state and advance progress through the game. The external image generation system acts the same no matter how complex the systems used to generate the commands. Whether the input was generated by a conventional hand-held controller, or through the complexity of the input channel 220, the external image generation system will act the same.

In addition to preparing input information for the external image generation system, the input channel 220 may also provide information for other surrounding devices such as, for example, any one or more of the input devices 102, or perhaps the central display, thereby altering state of any of these devices, and allowing for these devices to participate in the game state alterations caused by the player interacting with the interactive environment image 111.

As a further example, the user may interact with physical objects within the area of the interactive environment image 111. These physical objects are not virtual, but are real, and thus can be felt by the player as they interact with the physical object.

For instance, the physical object may be an actual physical game board. The input channel 220 may recognize the configuration of the game board and interpret player gestures (such as the movement of a physical game piece, or the interaction with a virtual object) with reference to the physical game board. For instance, in the MONOPOLY board game, a physical game board may be placed within a projected image that might include virtual objects such as for example, virtual chance and community chest cards, and virtual houses and hotels, and perhaps a combination of real and virtual game pieces (according to player preference configured at the beginning of a game). A player might tap on a property owned by that player, which the input channel 220 may interpret as an intent to build a house on the property. The input channel 220 might then coordinate with any external image generation system and the output channel 210 to cause an additional virtual house to appear on the property (with perhaps some animation). In addition, the input channel 220 may coordinate to debit the account of that player by the cost of a house. In addition, the user's personal input device 102 may be transmitted information to allow the personal input device 102 to update with a new account balance.

As another example of the MONOPOLY board game, the player might roll dice at the beginning of the player's turn. The input channel 220 may recognize what was rolled and cause the projected image to highlight the position that the player's game piece should move to. If the player has a virtual game piece, then the interactive image projection system 200 might automatically move (with perhaps some animation) the virtual game piece, or perhaps have the virtual game piece move with the player's interaction with the virtual game piece (perhaps configured by the user to suit his/her preference). In response, the interactive image projection system 200 might transmit a prompt to the user's input device 102, requesting whether the user desires to purchase the property, or notifying the user of rent owed. In one embodiment, the output channel 210 not only projects images, but also responds to an external game system to provide appropriate output to appropriate devices. For instance, the output channel 210 might recognize that the external game system is prompting the current player as to whether to purchase the property. The output channel 210, in addition to projecting the appropriate interactive environment image 111, may also transmit an appropriate prompt to the player's input device 102.

In yet a further example, the central display may provide a displayed image and be positioned within the projected image of the interactive image projection system 101. Thus, a projected image may be superimposed upon an image displayed by the central display.

Figure 4:
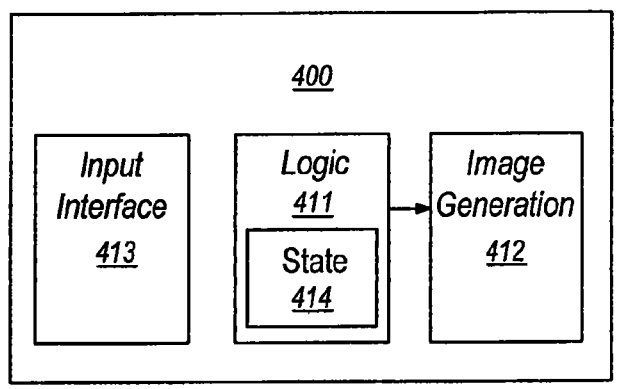
FIG. 4 abstractly illustrates an image generation system with which the interactive image projection system may operate.

Thus, the principles described herein may take a conventional system, and allow for a unique interaction with a projected image. That said, the principles described herein are not limited to operation with a conventional game environment image generation system. FIG. 4 abstractly illustrates an image generation system 400, which may be used to generate the input image 201 of FIG. 2. In one embodiment, the image generation system 400 may be a conventional video game which outputs an image that might, for example, change as a player progresses through the video game. However, one, some, and perhaps even all of the functions described as being included within the image generation system 400 may be performed instead within the interactive image projection system 101.

The image generation system 400 includes logic 411, image generation mechanism 412, and an input interface 413. The logic 411 and/or the image generation mechanism 412 have a concept for the virtual space in which the logic 411 operates. The image generation mechanism 412 generates an image that is appropriate given a current state 414 of the logic 411. The input interface 413 receives commands that may alter the state 414 of the logic 411, thereby potentially also affecting the image generated by the image generation mechanism 412. The game state may even be permanently altered from one stage to the next as the players advance through the game. In such systems 200, 400, images can be generated at such a rate that continuous motion is perceived. There may be a bi-directional channel of communication 1108 (FIG. 11) between the image generation system 400 and the interactive image projection system 200. The bi-directional channel of communication 1108 may be wired or wireless, or perhaps wired in one direction and wireless in another. Input commands are typically less data-intensive as compared to images, and thus the channel of communication 1108 from the interactive image projection system 200 to the image generation system 400 may be wireless. The channel of communication 1108 from the image generation system 400 to the interactive image projection system 200 may also be wireless provided that the bandwidth of the channel in that direction is sufficient.

The interactive image projection system 101, and/or any of the surrounding input devices 102 may have built in microphones to allow sound data (such as the player's voice) to be input into the image generation system 400 to affect the state 414. There may also be voice recognition capability incorporated into the interactive image projection system 101 and/or surrounding input devices 102 to permit such sound data to be converted to more usable form. Speakers, headset ports, and earpieces may also be incorporated into the surrounding input devices 102.

Figure 5:
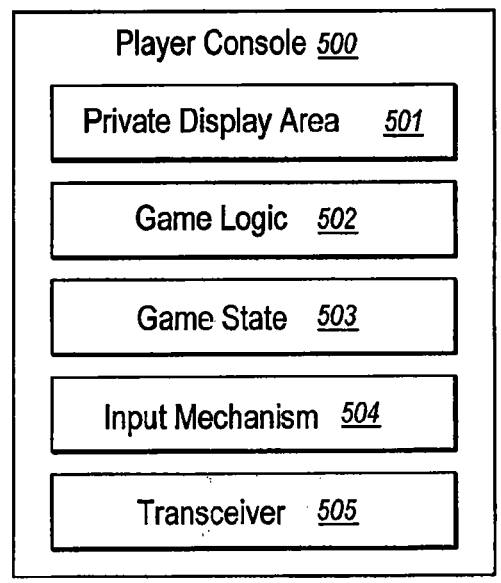
FIG. 5 abstractly illustrates a player console that represents an example of an input device of FIG. 1.
Figure 6:
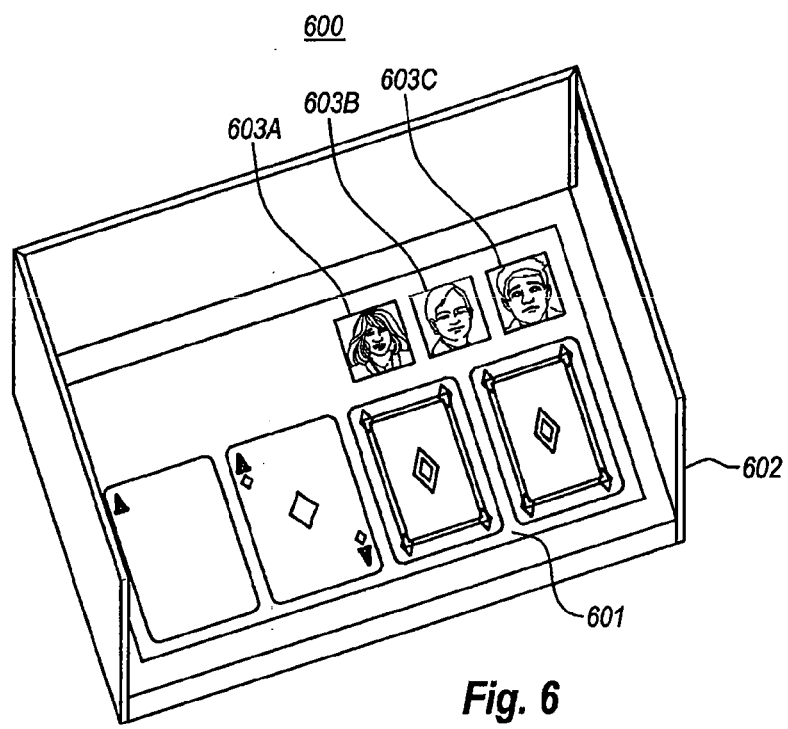
FIG. 6 illustrates a concrete example of a player console.

FIG. 5 abstractly illustrates a player console 500. As previously mentioned, the input devices 102 of FIG. 1 may be player consoles in the context in which the distributed electronic game system 100 is a game environment. FIG. 5 is an abstract illustration of a player console 500 showing functional components of the player console 500. Once again, FIG. 5 is abstract. Accordingly, the various components illustrated as being included within the player console 500 should not be construed as implying any particular shape, orientation, positioning or size of the corresponding component. FIG. 6 will illustrate a more concrete representation of an example of the player console 500.

Each player, or perhaps each player team, may have an associated player console 500, each associated with the corresponding player or team. The player console 500 includes a private display area 501 and game logic 502 capable of rendering at least a portion a private portion of game state 503 associated with the player (or team). The player or team may use an input mechanism 504 to enter control input into the player console 500. A transmission mechanism illustrated in the form of a transceiver 505 transmits that control input to the interactive image projection system 200 and/or to the image generation system 400, where the control input is used to alter the state 414 of the logic 411 used to generate the image.

FIG. 6 illustrate a concrete example of a player console 600. Here, the private display area 601 displays the player's private information (in this case, several playing cards). The player console 600 also includes a barrier 602 to prevent other players from seeing the private game state displayed on the private display area 601. The private display area 601 may be touch-sensitive, allowing the player to interact with physical gestures on the private display area 601, thereby causing control information to update the rendering on the private display area 601, and the game states on the player console 600, as well as on the central display 101. The private display area 601 also, in this example, displays video images 603A, 603B and 603C of other players.

Figure 7:
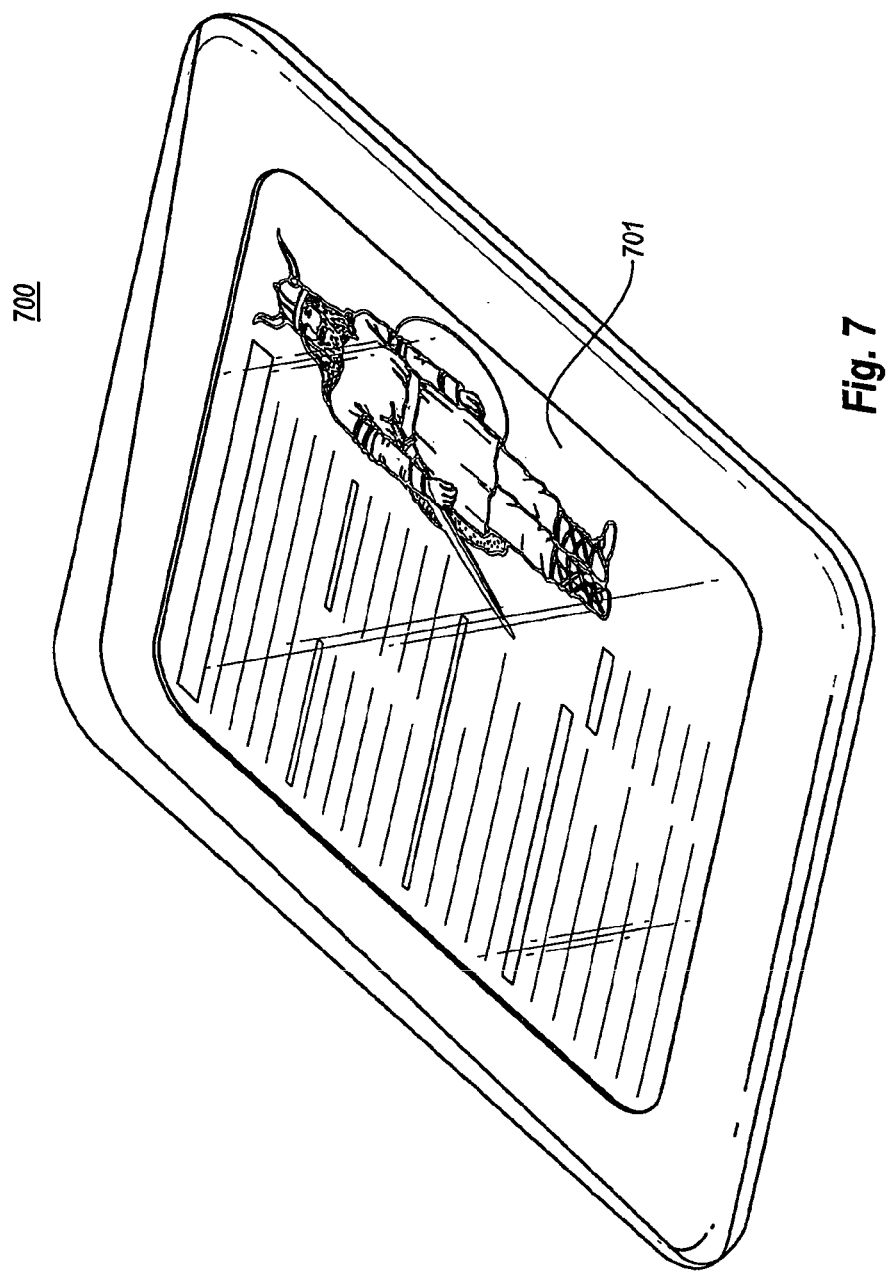
FIG. 7 illustrates another concrete example of a player console in the form of a game master player console.

In one embodiment, at least one of the player consoles is different from the remaining player consoles. FIG. 7 illustrates such a player console 700. In this case, the player console might be a game master console 700, in which the game master may interface with the private viewing area to perhaps control game state 503. For instance, the game master may use physical gestures on the touch-sensitive display 701 of the game master console 700 to affect what is displayed within the interactive environment image 111. For instance, the game master might control what portions of the map are viewable within the interactive environment image 111. The game master might also control what effect another player's actions might have on the operation of the game logic 502. The game master might also create a scenario and setting of a game using the game master console 700.

Figure 8:
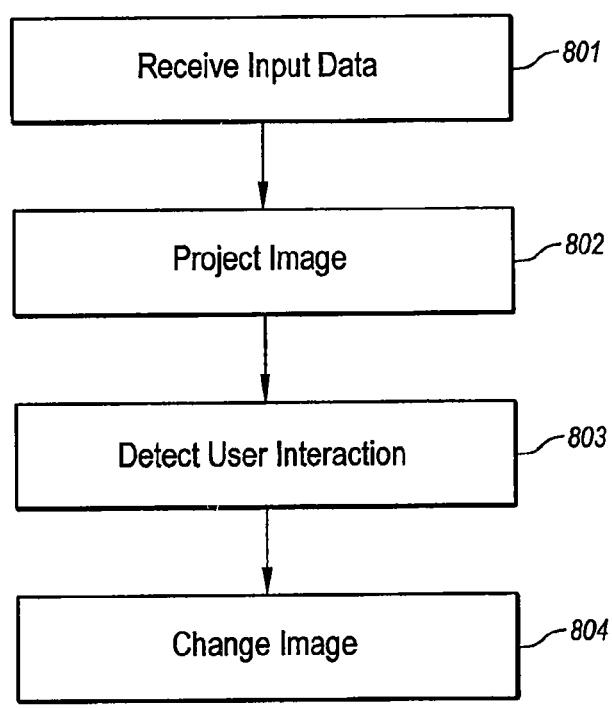
FIG. 8 illustrates a flowchart of a method for projecting an interactive environment image on a surface.

FIG. 8 illustrates a flowchart of a method 800 for projecting an interactive environment image 111 on a surface. The system receives data (act 801) representing some virtual objects that are spatially positioned in a virtual environment space 300. An example of such data is an image in which such virtual objects are represented. The image is then projected (act 802) on a surface in response to the received data. The projected image including a visual representation of at least part of the virtual environment space 300. The interactive image protection system 101 then detects user interaction (act 803) with the visualized representation. In response to that user interaction, the projected image is then altered (act 804).

Figure 9:
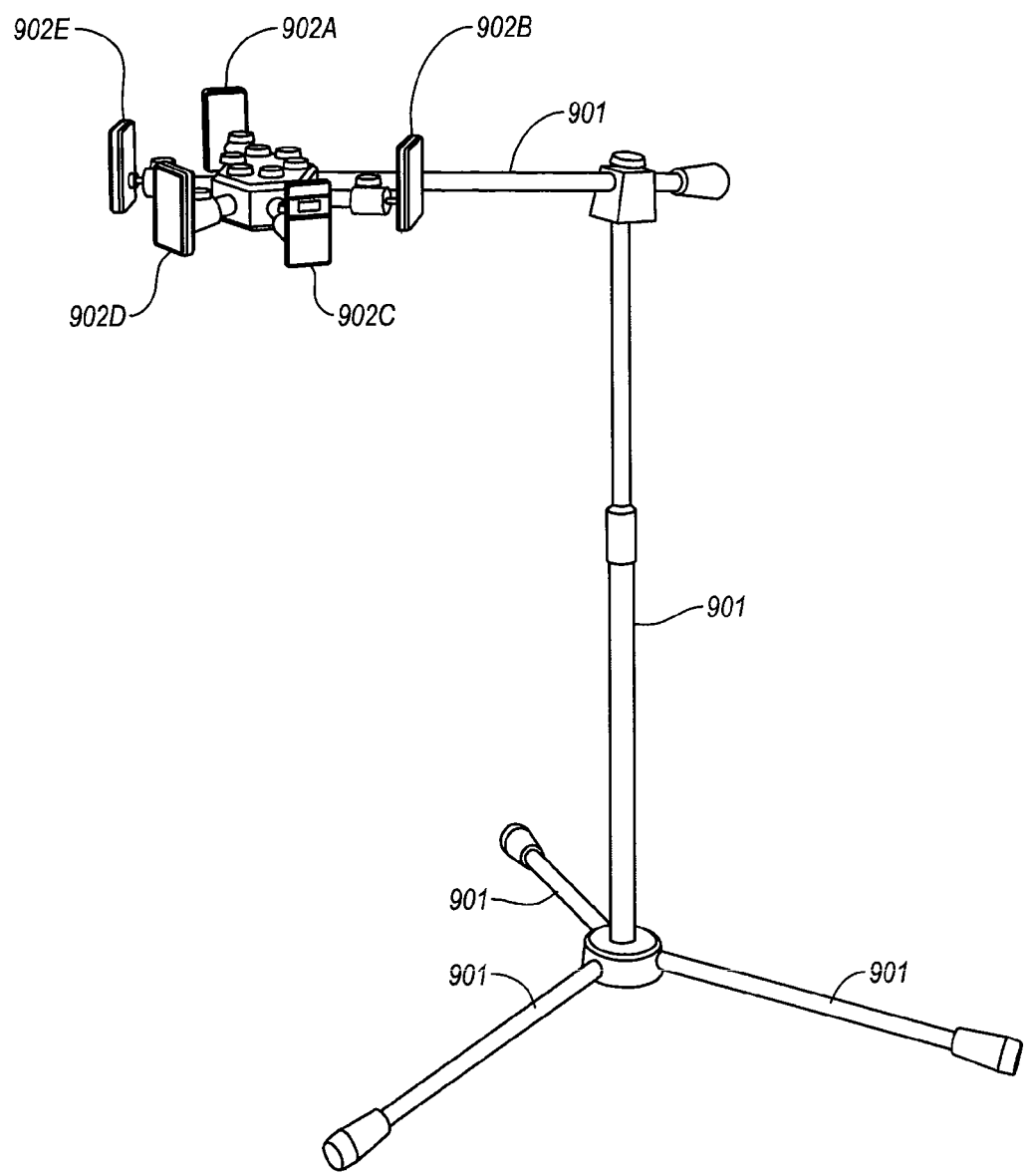
FIG. 9 illustrates a concrete example of the interactive image projection system in which multiple projectors are operating and that does not use intervening optics in the projection or scanning operations.

FIG. 9 illustrates a concrete example of the interactive image projection system 101 in which multiple modules 902A through 902E are mounted to a stand 901. Each module 902A through 902E includes a projector and a corresponding camera (not shown) which would be in the lower surface of each module 902A through 902E. The projector projects the images downward towards a floor on which the stand 901 is situated. These projectors would each project a corresponding subimage that are each processed such that the projected image is stitched together to appear as a single image on the floor. The camera scans the area of the projected image for user interaction in the area of the projected image. FIG. 9 does not use intervening optics in the projection or scanning operations.

FIG. 10 illustrates another concrete example of the interactive image projection system 101 in which a single projector 1011 is operating, and which does use intervening optics in the projection operation. The interactive image projection system 1000 includes a housing that includes a rigid base 1001 that is situated on a substantially horizontal surface. A projector 1011 projects a single image upward through a lens to be reflected off of a curved mirror 1012, through windows 1013, and downward onto the substantially horizontal surface on which the base 1001 is placed. The images are prepared to account for the intervening lenses and mirrors used to direct the image onto the horizontal surface. Four cameras (of which three 1021A through 1021C are visible in FIG. 10) are positioned around the upper circumference of the interactive image projection system 1000. Such cameras 1021A through 1021C scan the area of the projected image.

Accordingly, an interactive image protection system 1000 has just been described. Having described the embodiments in some detail, as a side-note, the various operations and structures described herein may, but need, not be implemented by way of a physical computing system. Accordingly, to conclude this description, an example computing system 1100 will be described with respect to FIG. 11. The computing system 1100 may be incorporated within the interactive image projection system 101, within one or more of the input devices 102, and/or within the image generation system 400.

FIG. 11 illustrates a computing system 1100. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any physical form and may depend on the nature and form of the computing system. A computing system may be distributed over a network environment 1110 and may include multiple constituent computing systems.

As illustrated in FIG. 11, in its most basic configuration, a computing system 1100 typically includes at least one processing unit 1102 and memory 1104. The memory 1104 is a physical system memory, which may be volatile, non-volatile, or some combination of the two. The term "memory" may also be used herein to refer to non-volatile mass storage such as physical storage media. If the computing system 1100 is distributed, the processing, memory and/or storage capacity may be distributed as well. As used herein, the term "module" or "component" can refer to software objects or routines that execute on the computing system 1100. The different components, modules, engines, and services described herein may be implemented as objects or processes that execute on the computing system 1100 (e.g., as separate threads).

In the description above, embodiments are described with reference to acts that are performed by one or more computing systems 1100. If such acts are implemented in software, one or more processors of the associated computing system 1100 that performs the act directs the operation of the computing system 1100 in response to having executed computer-executable instructions. An example of such an operation involves the manipulation of data. The computer-executable instructions (and the manipulated data) may be stored in the memory 1104 of the computing system 1100.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other physical medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The components of the computing system 1100 may, for example, be used to provide functionality to game logic, store or remember game state, configure and communicate between devices, and operate the logic of game incorporation. Each of the player consoles may also have a computing system such as computing system 1100 guiding their processing needs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for projecting an interactive environment image on at least one surface, the method comprising:
   projecting an environment image on a surface, the environment image comprising a visualized representation of at least part of a virtual environment space, the visualized representation including a visualized representation of a plurality of virtual objects; and
   detecting user interaction with the surface onto which the visualized representation is projected, including:
      scanning a three-dimensional space over the surface onto which the visual representation is projected for movement of a manipulating element into and within the three-dimensional space; and
      detecting virtual interaction of the manipulating element with a location over the surface corresponding to a location of a virtual object of the plurality of virtual objects over the surface.

2. The method of claim 1, wherein detecting the user interaction comprises detecting a physical movement or manipulation of a physical object within the three-dimensional space.

3. The method of claim 1, wherein detecting user interaction with the surface onto which the visualized representation is projected is based on extension of the manipulating element between a first location outside of the three-dimensional space and a second location within the three-dimensional space.

4. The method of claim 3, wherein detecting user interaction comprises distinguishing between a plurality of elements simultaneously extending between first locations outside of the three-dimensional space and second locations within the three-dimensional space.

5. The method of claim 1, further comprising:
   changing the visualized representation in response to interaction between the manipulating element and the surface onto which the visualized representation is projected.

6. The method of claim 5, wherein changing the visualized representation comprises affecting the visualized object with which the manipulating element has interacted.

7. The method of claim 6, wherein affecting the visualized object comprises moving, manipulating or changing the visualized object.

8. The method of claim 5, wherein changing the visualized representation comprises adding a new visualized object to the visualized representation.

9. The method of claim 1, wherein projecting the interactive environment image on the surface includes projecting at least a portion of the interactive environment image on a substantially horizontal surface.

10. The method of claim 9, wherein projecting the interactive environment image also includes projecting the interactive environment image on a substantially vertical surface.

11. The method of claim 1, wherein projecting the interactive environment image comprises projecting a prepared image tailored to a topography of the surface onto which the interactive environment image is projected to ensure that features of the interactive environment image are proportionately displayed on the surface.

12. The method of claim 1, wherein detecting user interaction with the surface includes detecting user interaction with a topography of the surface.

13. The method of claim 1, wherein the environment image includes three-dimensional information viewable by a user as a three-dimensional image.

14. The method of claim 1, wherein projecting the interactive environment image on the surface comprises projecting a plurality of sub-images on the surface from a plurality of discrete locations, the method further comprising:
   an act of formulating data representing the plurality of sub-images prior to projecting the plurality of sub-images.

15. A computing system, comprising:
   a projection element configured to project an interactive environment image on a surface; and
   a scanning mechanism configured to detect a user interaction with an interactive environment image that is projected on a surface, the interactive environment image including a visual representation of at least part of a virtual environment space in which a plurality of virtual objects are spatially positioned by:

scanning a three-dimensional space over the surface onto which the visual representation is projected for movement of a manipulating element into, and within the three-dimensional space; and detecting a virtual interaction of the manipulating element with a location over the surface corresponding to a location of a virtual object of the plurality of virtual objects over the surface.

16. The computing system of claim 15, wherein the scanning mechanism is further configured to detect a user interaction with an interactive environment image that is projected on the surface by:

detecting extension of the manipulating element into the three-dimensional space from a location outside of the three-dimensional space.

17. The computing system of claim 15, further comprising:

at least one processing element programmed to change the visual representation in response to the user interaction with the visual representation.

18. The computing system of claim 17, wherein the scanning mechanism comprises the at least one processing element and at least one camera.

19. A portable projection system, comprising:

at least one projector configured to project an interactive environment image representing a plurality of virtual objects that are spatially positioned in a virtual environment space; and a scanning mechanism configured to scan an area onto which the interactive environment image is projected to determine one or more positions of a contact-based interactivity, the scanning mechanism configured to:

scan a three-dimensional space over the area onto which the interactive environment image is projected for movement of a manipulating element relative to the interactive environment image; and detect virtual interaction between a manipulating element and a location over the surface corresponding to a location of a virtual object of the plurality of virtual objects over.

20. The portable projection system of claim 19, wherein the scanning mechanism is further configured to:

detect extension of the manipulating element into the three-dimensional space from a location outside of the three-dimensional space.

* * * * *